(12) United States Patent
Maki et al.

(10) Patent No.: US 6,844,979 B2
(45) Date of Patent: Jan. 18, 2005

(54) PROJECTION DISPLAY APPARATUS

(75) Inventors: Hiroshi Maki, Kanagawa-ken (JP); Tetsuo Hattori, Yokohama (JP); Takuya Shimbo, Hiratsuka (JP)

(73) Assignee: Nikon Corporation, Tokyo (JP)

( * ) Notice: Subject to any disclaimer, the term of this patent is extended or adjusted under 35 U.S.C. 154(b) by 52 days.

(21) Appl. No.: 10/452,227

(22) Filed: Jun. 3, 2003

(65) Prior Publication Data

US 2003/0231287 A1 Dec. 18, 2003

(30) Foreign Application Priority Data

| Jun. 12, 2002 | (JP) | 2002-171487 |
| Jul. 25, 2002 | (JP) | 2002-216248 |
| Nov. 20, 2002 | (JP) | 2002-336225 |
| Apr. 11, 2003 | (JP) | 2003-107489 |

(51) Int. Cl.⁷ .................. G02B 27/14; G03B 21/26; G03B 21/22; G02F 1/1335; G02F 1/1333
(52) U.S. Cl. .................. 359/629; 359/634; 353/30; 353/31; 353/119; 349/5; 349/58; 349/137
(58) Field of Search .................. 359/629, 634, 359/638, 639, 640; 353/20, 30, 31, 33, 34, 37, 119; 349/5, 9, 58, 137

(56) References Cited

U.S. PATENT DOCUMENTS

| 6,530,665 B2 | * | 3/2003 | Takizawa et al. | ...... 353/119 |
| 6,669,344 B2 | * | 12/2003 | Ishii | ...... 353/20 |
| 2003/0223045 A1 | * | 12/2003 | Saitoh | ...... 353/30 |

FOREIGN PATENT DOCUMENTS

JP 10-133301 5/1998

* cited by examiner

Primary Examiner—Loha Ben
(74) Attorney, Agent, or Firm—Miles & Stockbridge P.C.

(57) ABSTRACT

A projection display apparatus in which a light emitted from a reflective light valve is made incident on a prism member and a light having passed through the prism member is projected by a projection lens, comprises a dust proofing cover that provides a seal between an emergence surface of the reflective light valve and an incidence surface of the prism member.

20 Claims, 12 Drawing Sheets

US 6,844,979 B2

PROJECTION DISPLAY APPARATUS

This application claims the benefit of Japanese Patent applications No. 2002-171487, No. 2002-216248, No. 2002-336225 and No. 2003-107489 which are hereby incorporated by reference.

BACKGROUND OF THE INVENTION

1. Field of the Invention

The present invention relates to a projection display apparatus, and particularly to a projection display apparatus that uses a reflective light valve.

2. Related Background Art

Japanese Patent Application Laid-Open No. 10-133301, which is owned by the assignee of the present application, discloses a projection display apparatus in which light from a light source is color-separated into an R (red) light, a G (green) light and a B (blue) light, the color lights are then made incident on corresponding polarizing beam splitters disposed at predetermined positions respectively so as to be split, one of the polarized light components of each color light that has been emitted from the polarizing beam splitter is then made incident on a corresponding reflective light valve disposed for each color and reflected by it while modulated by a color signal of the corresponding color, the lights of the respective colors emergent from the respective reflective light valves are then analyzed by the polarizing beam splitters so that the modulated light components are picked up, and the analyzed lights of the respective colors are color-composed and thereafter projected by a projection lens.

In connection with the above-described type of projection display apparatus, it has been known to dispose a quarter-wave plates in the spaces between the light valves for the respective color lights and the polarizing beam splitters in order to enhance contrast of projected images.

The above-described projection display apparatus suffers from a problem that an image of dust adhering to the light valves is projected onto a screen by the projection lens. In addition, since the quarter-wave plate provided for the respective color lights are located at positions closed to the light valves, an image of dust adhering to the quarter-wave plate is also projected onto the screen.

SUMMARY OF THE INVENTION

An object of the present invention is to provide a projection display apparatus that does not suffer from the above-mentioned problem of dust.

In view of the above object, according to the present invention, there is provided a projection display apparatus in which a light emitted from a reflective light valve is made incident on a prism member and a light having passed through said prism member is projected by a projection lens, the apparatus comprising a dust proofing cover that provides a seal between an emergence surface of said reflective light valve and an incidence surface of said prism member.

Preferably, in this projection display apparatus according to the present invention, a wave plate may be provided between the reflective light valve and the prism member, the space between the emergence surface of the reflective light valve and the incidence surface of the prism member that contains the wave plate may be structured as a dustproof space sealed by a dust proofing cover, there may be further provided a holder made of a metal for disposing the wave plate in the dustproof space to which holder the wave plate is directly attached, and a part of the holder may be exposed to the exterior of the dustproof space.

The wave plate can be cooled by application of cooling airflow to the part of the holder that is exposed to the exterior of the dustproof space, and therefore malfunction of the wave plate due to overheating can be prevented while a high contrast projected image free from dust images can be obtained.

In the above-mentioned projection display apparatus according to the present invention, it is preferable that said part of the holder made of a metal be applied with cooling airflow or said part of the holder be cooled by a cooling element so that the wave plate would be cooled.

According to a preferred aspect of the present invention, there is provided an optical part for use in a projection display apparatus having a prism member for receiving a light emitted from a reflective light valve via a wave plate, in which a light having passed through the prism member is projected by a projection lens, the optical part comprising said reflective light valve, said wave plate and said prism that are integrated as a unit, wherein a space between the emergence surface of the reflective light valve and the incidence surface of the prism member that contains the wave plate is sealed to be a dustproof space, and a part of a holder made of a metal for disposing the wave plate in the dustproof space, which holder is directly attached with the wave plate, is exposed to the exterior of the dustproof space.

According to another preferred aspect of the present invention, there is provided a projection display apparatus in which a light emitted from a reflective light valve is made incident on a prism member and a light having passed through said prism member is projected by a projection lens, comprising:

a plate having an outer size larger than the reflective light valve on which the reflective light valve is attached; and at least two dust proofing members provided between the plate and the incidence surface of the prism member, the dust proofing member being deformable upon application of stress and each having an opening having a size sufficient for surrounding the reflective light valve;

wherein, the reflective light valve is inserted in the opening of the first dust proofing member among the dust proofing members and a frame portion of the first dust proofing member is pressed against the plate;

a frame of the second dust proofing member among the dust proofing members is pressed against the incidence surface of the prism;

the first dust proofing member and the second dust proofing member are in contact with each other, or alternatively, at least one of another member having a frame-like structure and another dust proofing member is provided between the first dust proofing member and the second dust proofing member; and a compressing force is applied to the plate and the prism in a sandwiching manner.

In the projection display apparatus according to this preferred aspect of the present invention, a dustproof space is formed by the plate, the prism, the first dust proofing member, the second dust proofing member, and the optionally provided another member having a frame-like structure or another dust proofing member, and the light valve is accommodated in this dustproof space. In addition, a compressing force is applied to the plate and the prism in a sandwiching manner. Therefore, the members that constitute the dustproof space in tight contact with each other, and a reliable dustproof structure is realized. Consequently, dust or other foreign matters would be prevented from adhering to the light valve. In addition, since the dustproof members are composed of two or more members, the thickness of each member may be small, and therefore they are easy to manufacture.

In the projection display apparatus described just above, said another member having a frame-like structure may be an auxiliary member of a thin plate-like form. When the auxiliary member having a thin plate-like shape is used as said another member having a frame-like structure, even if the surface condition of said second dust proofing member is not good, close surface contact would be realized upon application of a pressing force by virtue of a good surface condition of that auxiliary member.

The projection display apparatus described just above may be constructed in such a way that said another member having a frame-like structure is a wave plate holder having a frame-like shape to which a wave plate is attached, a dust proofing member having a frame-like shape is further attached to a frame portion of the wave plate holder on its light valve side, and the frame portion of the dust proofing member is in direct contact with said first dust proofing member, or at least one of still another member of a frame-like structure and another dust proofing member is provided between them. In this structure, even if a wave plate is provided between the light valve and the prism, the space in which the light valve is placed can be a dustproof space, so that dust or other foreign matters would be prevented from being attached to the light valve.

DETAILED DESCRIPTION OF THE PREFERRED EMBODIMENTS

In the following, embodiments of the present invention will be described with reference to the annexed drawings.

Figure 4:
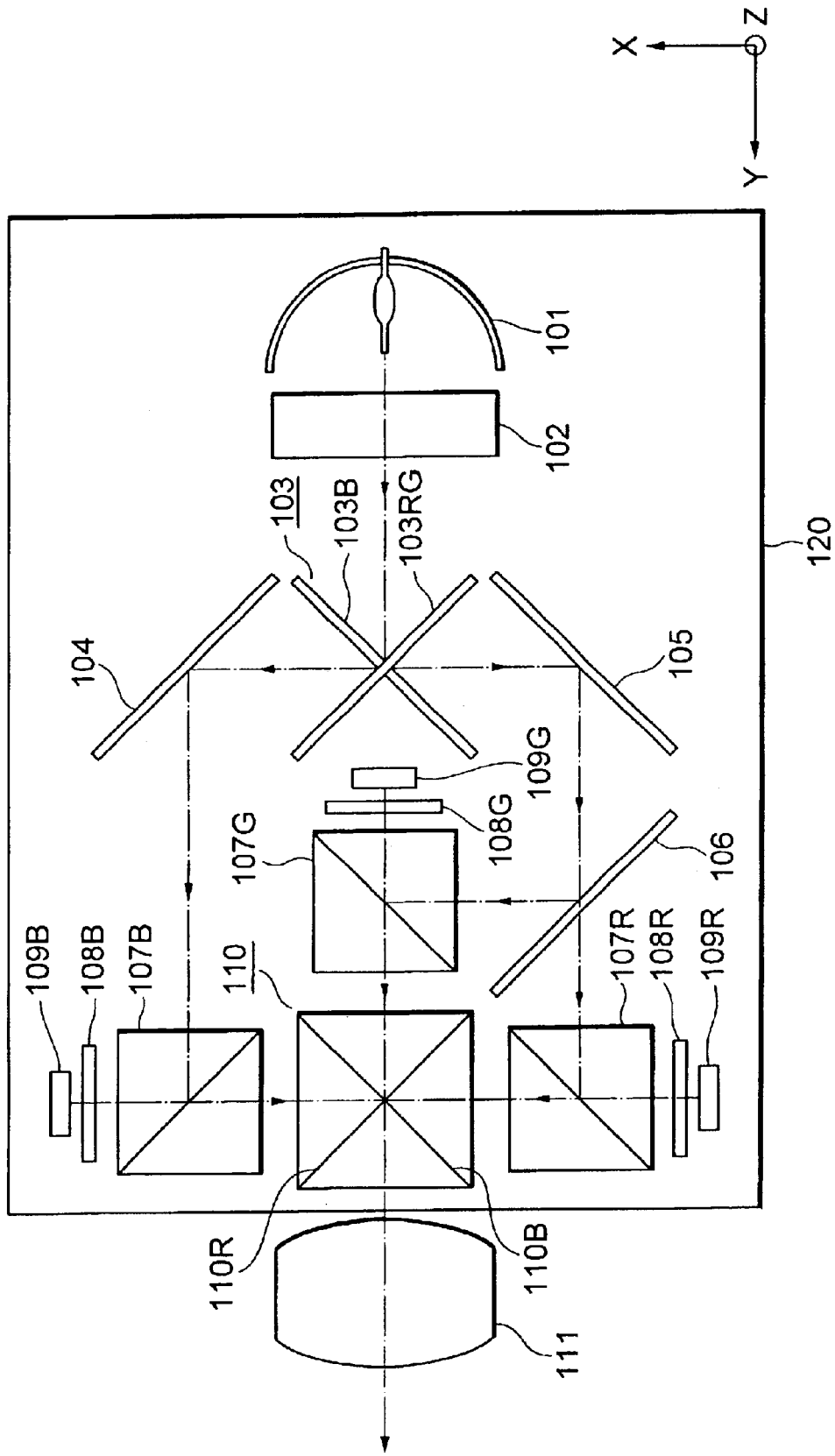
FIG. 4 is a diagram showing the basic structure of the projection display apparatus according to the first embodiment of the present invention.

FIG. 4 is a diagram showing the basic structure of a projection display apparatus as a first embodiment of the present invention.

As indicated in FIG. 4, X, Y and Z-axes are defined orthogonal to each other. It should be noted that Z-axis is perpendicular to the plane of the drawing sheet.

Source light emitted from a light source 101 composed of a lamp and a concave mirror such as a parabolic mirror is incident on a polarization converting device 102 so as to be converted into a single linearly polarized light (which has, in this embodiment, the direction of oscillation parallel to Z-axis). The light is then incident on a cross dichroic mirror 103 in which a B (blue) light reflective dichroic mirror 103B and an R (red) and G (green) light reflective dichroic mirror 103RG are arranged orthogonal to each other to form an X-shape, so that the light is color-separated into a B light and a mixed light including R light and G light.

The B light is reflected by a deflecting mirror 104 to change its direction of travel and incident on a polarizing beam splitter 107B for B light. On the other hand, the mixed light including R light and G light is reflected by a deflecting mirror 105 to change its direction of travel to enter a G light reflective dichroic mirror 106, so as to be color-separated into an R light that is transmitted and a G light that is reflected. The R light and the G light thus separated are incident on a polarizing beam splitter 107R and a polarizing beam splitter 107G respectively.

The respective color lights incident on the polarizing beam splitters 107B, 107R and 107G for the respective color lights are reflected by polarizing splitting portions. The polarized lights emergent from the polarizing beam splitters 107B, 107R and 107G are incident on reflective light valves 109B, 109R and 109G for the respective color lights after passing through quarter-wave plates 108B, 108R and 108G provided for the respective color lights. The lights incident on the reflective light valves 109B, 109R and 109G are subjected to modulation by color signals of the respective colors and reflected to be emitted from them. Then, they are incident on the polarizing beam splitters 107B, 107R and 107G after passing through the quarter-wave plates 108B, 108R and 108G, so that only the modulated lights are picked up (or analyzed) as transmitted lights.

The analyzed lights of the respective colors are incident on a cross dichroic prism for performing color composition from different incidence surfaces respectively, so that the B light is reflected by a B light reflective dichroic film 110B, the R light is reflected by an R light reflective film 110R, and the G light is transmitted by both the dichroic films 110B and 110R so as to be color-composed and emergent from an emergence surface. The composite light emergent from the cross dichroic prism 110 is then incident on a projection lens 111, so that a full color image is projected onto a screen, which is not shown.

As shown in FIG. 4, the all of the above-mentioned constituent parts are housed in a housing 120 except for the projection lens 111. The projection lens 111 is secured to the housing 120 to be integral with it.

An optical system composed of the light valves 109B, 109R and 109G, the quarter-wave plate 108B, 108R and 108G, the polarizing beam splitters 107B, 107R and 107G and the cross dichroic prism 110 will be referred to as an analyzing-composing optical system hereinafter. In this connection, the analyzing-composing optical system is made integral by means of integrating (or uniting) members that will be described later. The light valves 109B, 109R and 109G and the quarter-wave plates 108B, 108R and 108G in the integrated analyzing-composing optical system are supplied with cooling air flowing in the direction of Z-axis by means of a cooling fan 140 (shown in FIG. 1) disposed beneath (in the depth direction of the drawing sheet of FIG. 4) the analyzing-composing optical system.

Figure 1:
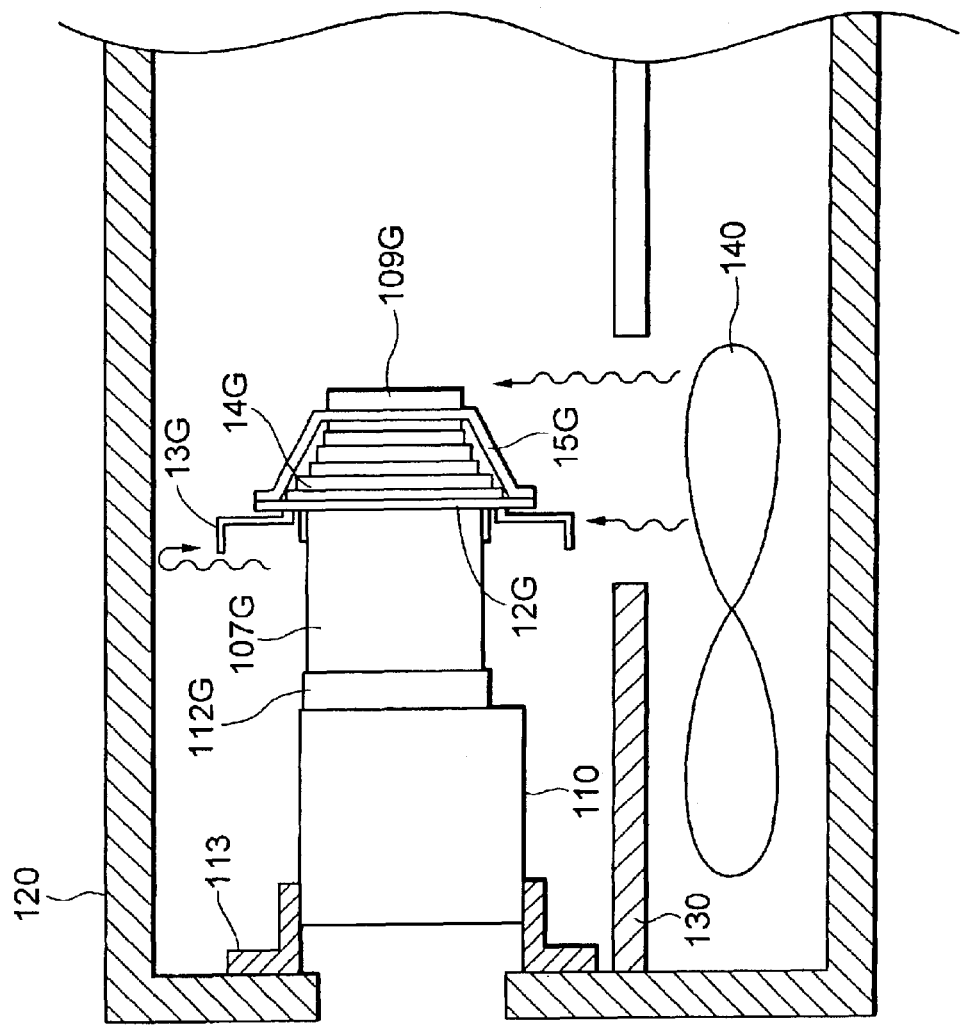
FIG. 1 is a side view showing an analyzing-composing optical system used in a projection display apparatus according to a first embodiment of the present invention.

In the following, integration of the analyzing-composing optical system will be described with reference to FIG. 1. FIG. 1 is a side view of the analyzing-composing optical system as seen from a direction parallel to X-axis shown in FIG. 4 (the housing 120 is depicted in its cross section).

In FIG. 1, only a structure of the light valve 109G for G light, a dust proofing cover 14G (in which the quarter-wave plate 108G (not shown in this drawing) is accommodated) and the polarizing beam splitter 107G is illustrated, but the light valves for R light and B light are not shown, since there are no differences in structures of them.

As shown in FIG. 1, the cross dichroic prism 110 in the integrated analyzing-composing optical system is secured to the housing 120 by means of integrating member 113. The opening potion of the housing 120 to which the integrating member 113 is secured also serves as a mount for the projection lens 111.

As shown in FIG. 1, the polarizing beam splitter 107G and the cross dichroic prism 110 are cemented with a glass plate member 112G so as to be integrated (i.e. made into a unit). The light valve 109G, the quarter-wave plate 108G and the polarizing beam splitter 107G are also integrated by means of certain members that will be described later.

Figure 2:
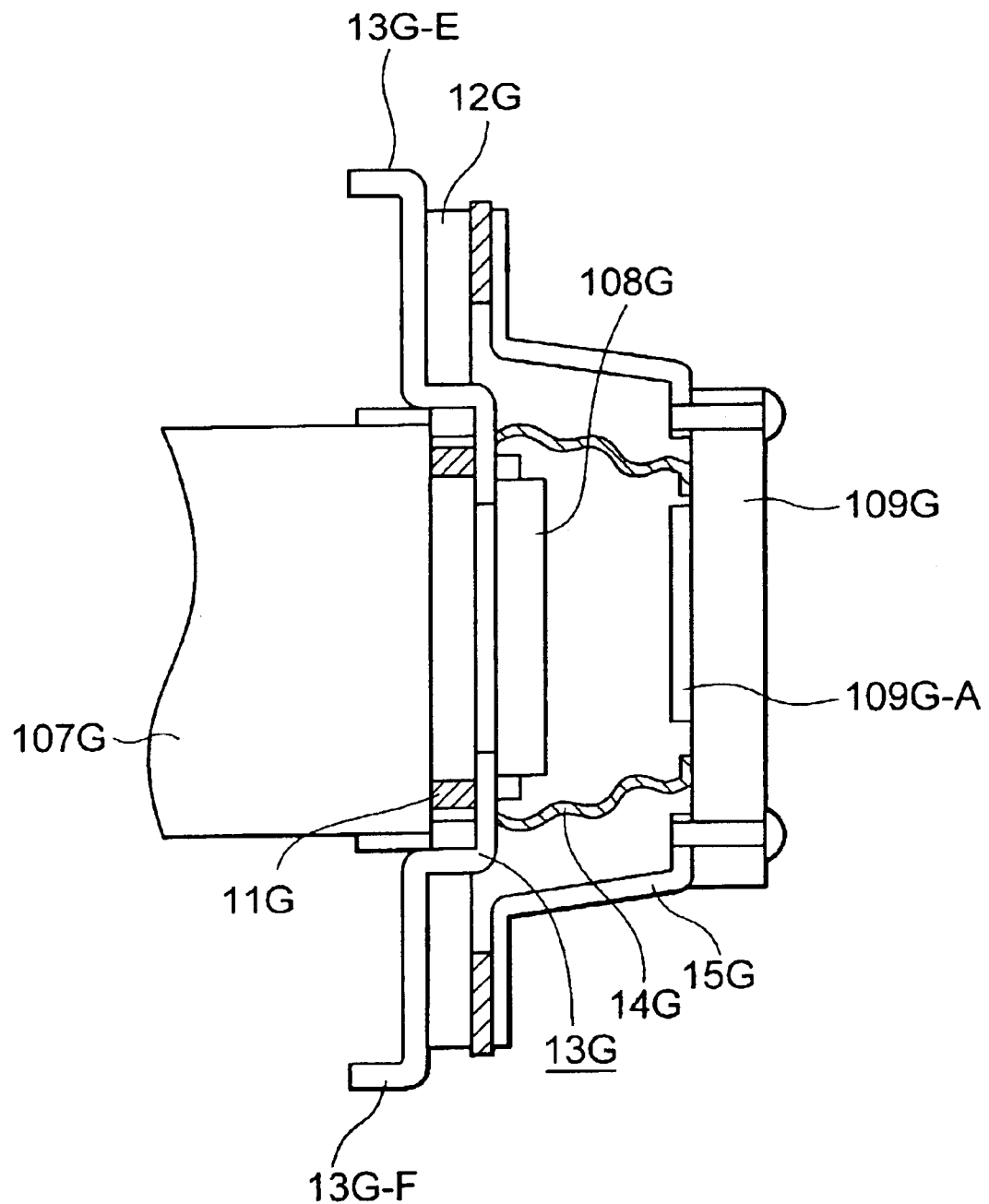
FIG. 2 is an enlarged view showing a portion of the structure shown in FIG. 1.
Figure 3:
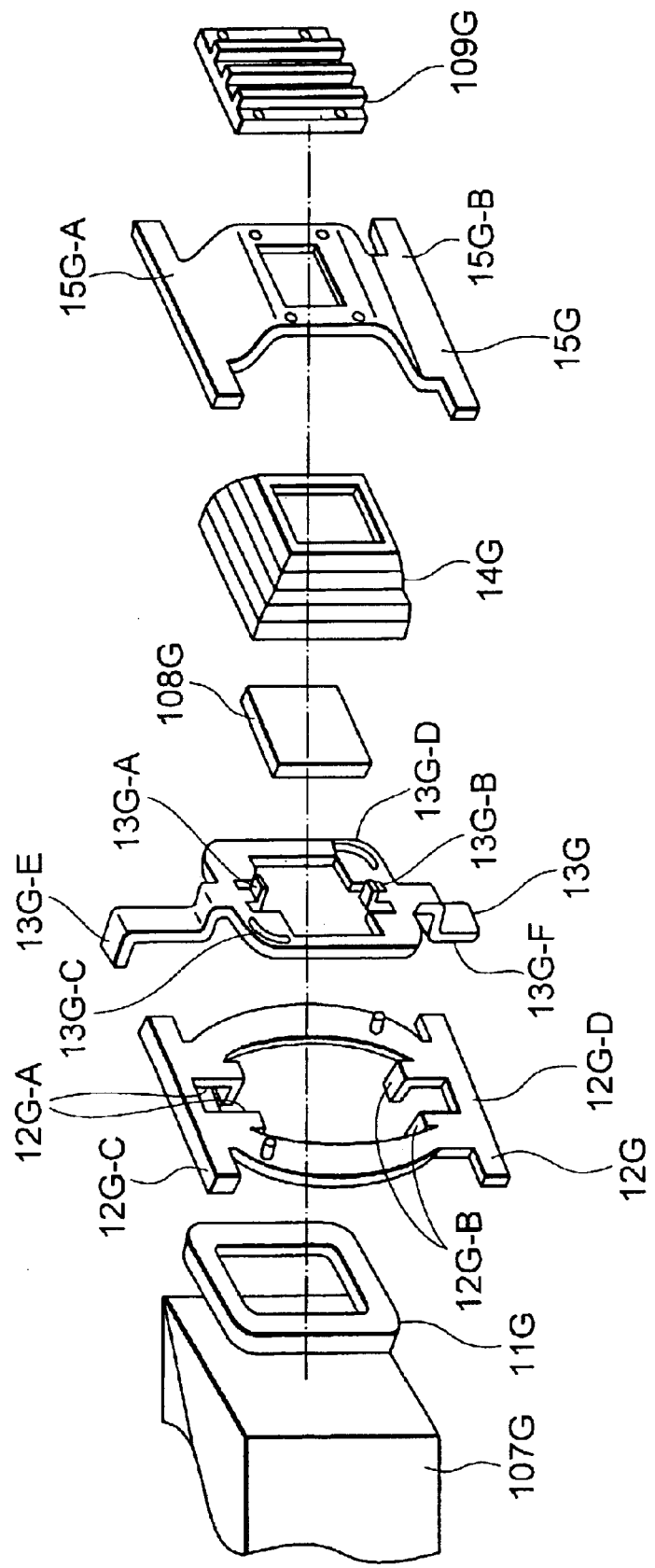
FIG. 3 is an exploded perspective view of the portion show in FIG. 2.

FIG. 2 is a cross sectional view which shows a part of FIG. 1 in an enlarged manner. FIG. 3 is an exploded perspective view of the portion shown in FIG. 2.

As shown in FIG. 3, the light valve 109G is integrated with a cooling member having cooling fins made of a metal material formed on the backside of the light valve 109G. A front side glass 109G-A (shown in FIG. 2) of the light valve 109G is fitted into an opening formed in the center of a light valve holder 15G and the cooling member and the light valve holder 15G are secured by screws, so that the light valve 109G and the light valve holder 15G are made integral.

The light valve holder 15G is made of a metal material and has attaching portions 15G-A and 15G-B located at its upper and lower edges to be soldered to a polarizing beam splitter holder 12G, which will be described later.

The quarter-wave plate 108G is attached to a quarter-wave plate attaching holder 13G made of a metal material. The quarter-wave plate 108G is pinched, at its upper and lower edges, between attaching portions 13G-A and 13G-B of the holder 13G formed by bending portions of the upper and lower edges of the central opening of the quarter-wave plate attaching holder 13G, and pressed against the outer frame portion of the quarter-wave plate attaching holder 13G that surrounds the opening, so that the quarter-wave plate 108G is attached to the quarter-wave plate attaching holder 13G.

The outer frame of the quarter-wave plate attaching holder 13G that surrounds the opening has arcuate holes 13G-C and 13G-D formed therethrough, through which two pins provided on the polarizing beam splitter holder 12G are to be inserted to allow adjustment of tilt of the optical axis of the quarter-wave plate 108G by rotating the quarter-wave plate 13G attached with the quarter-wave plate 108G with respect to the optical axis, in order to obtain a high contrast projected image.

At the upper and lower ends of the quarter-wave plate attaching holder 13G, there is provided cooling portions 13G-E and 13G-F for allowing rotation of the quarter-wave plate attaching holder 13G and for cooling the quarter-wave plate 108G via the quarter-wave plate attaching holder 13G.

To the polarizing beam splitter 107G, the polarizing beam splitter holder 12G is first attached. The polarizing beam splitter holder 12G is so attached to the polarizing beam splitter 107G that the polarizing beam splitter 107G is pinched at its upper and lower surfaces between attaching portions 12G-A and 12G-B that are formed by bending portions of the edges of the central opening of the polarizing beam splitter holder 12G. The attaching portions 12G-A and 12G-B are bonded to the polarizing beam splitter 107G.

In doing so, the dust proofing sheet 11G is inserted in the central opening of the polarizing beam splitter holder 12G.

The cooling portions 13G-E and 13G-F of the quarter-wave plate attaching holder 13G attached with the quarter-wave plate are inserted into the slots formed between the attaching portions 12G-A and between the attaching portions 12G-B disposed at the upper and lower edges of the opening of the polarizing beam splitter holder 12G attached with the polarizing beam splitter, so that the cooling portions 13G-E and 13G-F would extend to the opposite side (i.e. the side facing the polarizing beam splitter 107) and the outer frame portion surrounding the opening of the quarter-wave plate attaching holder 13G would be pressed to the dust proofing sheet 11G.

Thus, the dust proofing sheet 11G will be pressed to the emergence (or exit) surface of the polarizing beam splitter 107G and to the outer frame portion of the opening of the quarter-wave plate attaching holder 13G attached with the quarter-wave plate 108G, and therefore the dustproof effect is ensured.

Next, the dustproof cover 14G, the quarter-wave plate 108G and the quarter-wave plate attaching holder 13G are sandwiched between the light valve holder 15G attached with the light valve 109G and the polarizing beam splitter holder 12G.

The attaching portions 15G-A and 15G-B of the light valve holder 15G are attached to the attaching portions 12G-C and 12G-D of the polarizing beam splitter holder 12G respectively by soldering.

Under this state, the dustproof cover 14G is in pressed contact with the light valve holder 15G and with the outer frame surrounding the opening of the quarter-wave plate attaching holder 13G, so that the dustproof effect is ensured.

It would be understood from FIG. 2 that the light valve 109G and the quarter-wave plate 108G are in a space in which dustproof is ensured (i.e. a dustproof space). In addition, it would also be understood that the cooling portions 13G-E and 13G-F of the quarter-wave plate attaching holder 13G attached with the quarter-wave plate 108G are exposed to the exterior (i.e. the exterior of the above-mentioned dustproof space) while the dustproof effect is still ensured.

As shown in FIG. 1, a cooling airflow generated by the cooling fan 140 is delivered, via the opening formed on the floor member 130, to the analyzing-composing optical system that has been integrally assembled in a state in which the dustproof structure with respect to the incidence (or entrance) surface of the light valve 109G and the quarter-wave plate 108G is ensured. Thus, the cooling fins formed on the back surface of the light valve receive the cooling airflow, and therefore the light valve and other members can be cooled.

According to this embodiment, since the incidence surfaces of the light valves 109R, 109G and 109B and the quarter-wave plates 108R, 108G and 108B disposed between the light valves 109R, 109G and 109B and the polarizing beam splitters 107R, 107G and 107B are placed in the respective dustproof spaces, it is possible to prevent dust from adhering to the surfaces of the light valves 109R, 109G and 109B or the surfaces of the quarter-wave plates 108R, 108G and 108B.

In addition, the cooling portions 13G-E and 13G-F of the quarter-wave plate attaching holder 13G attached with the quarter-wave plate 108G that are exposed to the exterior are directly cooled by the cooling airflow from the cooling fan 140.

Therefore, heat is exchanged between the cooling portions 13G-E and 13G-F and the quarter-wave plate attaching holder 13G, so that the quarter-wave plate 108G that is in contact with the quarter-wave plate attaching holder 13G can be cooled. A portion of the cooling airflow will be delivered to the upper portion of the housing 120 and returned by the ceiling of the housing to flow downward, as indicated by an arrow in FIG. 1, so as to cool the upper cooling portion 13G-E of the quarter-wave plate attaching holder 13G.

The dust proof structures on the light valves 109R and 109B are the same as the above described structure with respect to the light valve 109G, although not shown.

In the above-described embodiment of the projection display apparatus, the quarter-wave plates 108R, 108G and 108B are disposed between the reflective light valves 109R, 109G and 109B and the polarizing beam splitters 107R, 107G and 107B. However, the wave plates used are not limited to quarter-wave plates (see U.S. Pat. No. 6,082,861).

Quarter-wave plates that can be used in such a case in which the light valves to be used is so designed and manufactured that no phase variation due to pre-tilt of their liquid crystal layers would occur.

In the case in which the reflective light valves 109R, 109G and 109B used in the projection display apparatus shown in FIG. 4 are such light valves in which a change in the phase of incident polarized light due to twist of liquid crystal in the liquid crystal layers and birefringence of the liquid crystal layers is not negligible, the quarter-wave plates 107R, 107G and 107B would be replaced by wave plates serving as compensating plates that are designed taking into account values for compensating the change in the phase. In connection with this, since the shape of the wave plate can be all the same irrespective of its optical characteristics, it is still possible to provide a projection display apparatus having a structure the same as the above-described embodiment to realize the same advantageous effects as above.

In addition, it should also be understood that the overall structure of the projection display apparatus in connection with the above-described embodiment is not limited to the structure shown in FIG. 4.

In the following, a description will be made of another example in which the present invention is applied to a projection display apparatus having a different structure.

Figure 5:
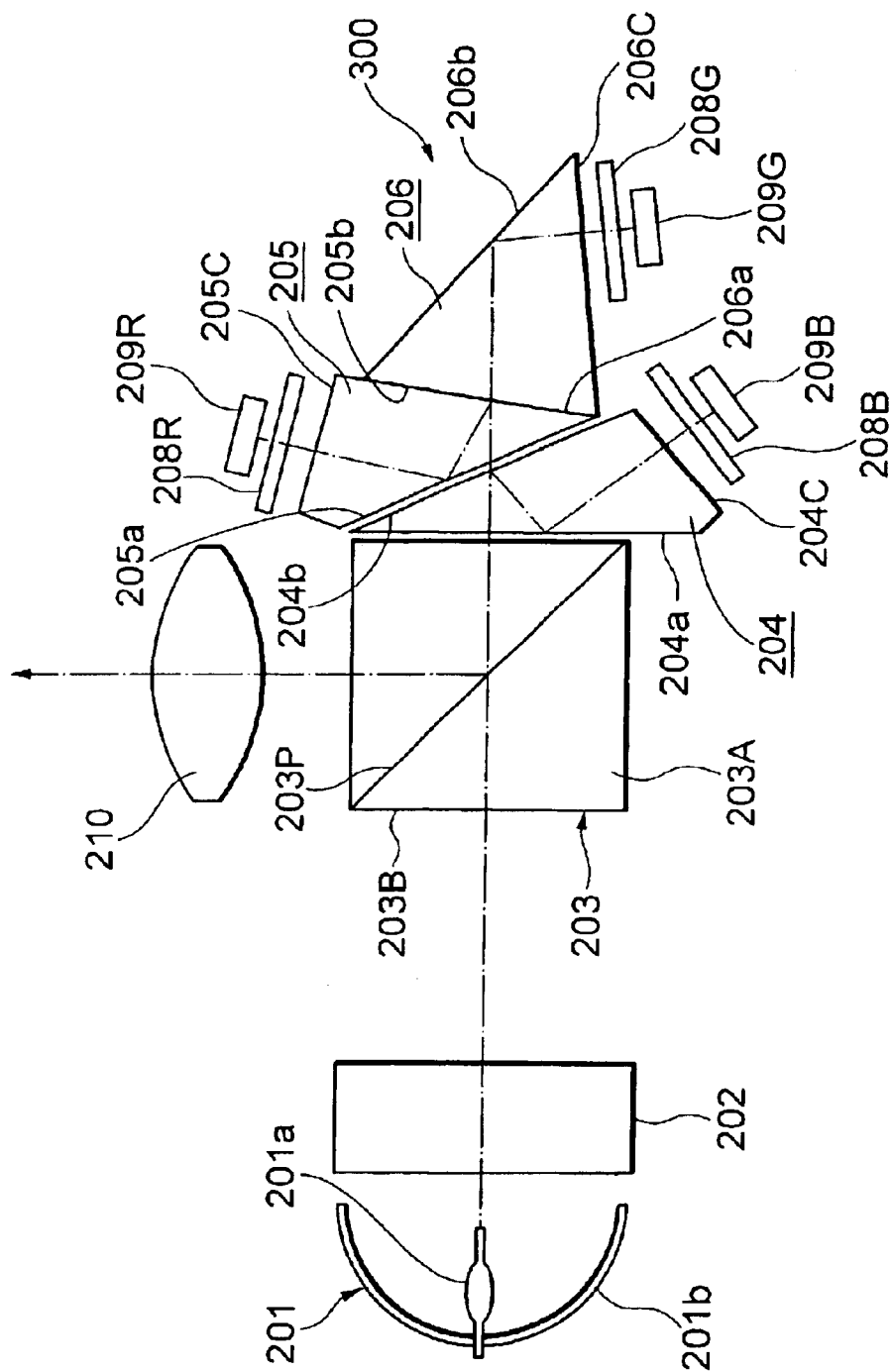
FIG. 5 is a diagram showing the basic structure of the projection display apparatus according to a second embodiment of the present invention.

FIG. 5 is a diagram showing the basic structure of the projection display apparatus according to a second embodiment of the present invention.

This projection display apparatus includes a light source 201, a polarization converting device 202, a polarizing beam splitter 203, a color-composing/separating prism 300, phase plates 208R, 208G and 208B, light valves 209R, 209G and 209B and a projection lens 210.

The light source is composed of a lamp 201a and a concave mirror 201b having a parabolic surface.

The polarization converting device 202 is adapted to convert source light emitted from the light source 201 into a single substantially linearly polarized light.

The polarizing beam splitter 203 is composed of triangular prisms 203A and 203B and a polarizing splitting portion 203P formed at the cementing surfaces of those prisms.

The color-composing/separating prism 300 is composed of prisms (or prism elements) 204, 205 and 206.

The prism 204 has a first surface 204a, a second surface 204b and a third surface 204c. The prism 204 is adapted to pick up a B light component from the source light. The second surface 204b of the prism 204 is provided with a B-light reflective dichroic film that reflects B-light and transmits R-light and G-light.

The prism 205 is disposed to face the second surface 204b of the prism 204 with a space therebetween. The prism 205 is adapted to pick up an R light component from the source light. The prism 205 has a first surface 205a, a second surface 205b and a third surface 205c. The second surface 205b of the prism 205 is provided with a B-light reflective dichroic film that reflects B-light and transmits G-light.

The prism 206 has a first surface 206a, a second surface 206b and a third surface 206c. The prism 206 is adapted to pick up a G light component from the source light. The first surface 206a of the prism 206 is cemented to the second surface 205b of the prism 205.

The wave plates 208R, 208G and 208B function as compensating plates to compensate changes in the phases of the respective color lights caused by the dichroic films and total reflection films.

The light valves 209R, 209G and 209B are reflective light valves. The light valves 209R, 209G and 209B modulate the polarization states of the corresponding incident lights.

The projection lens is a wide-angle projection lens.

The source light from the light source 201 is changed into substantially parallel light by the concave mirror 201b. The light is then converted by the polarization converting device 202 into P-polarized light that oscillates in the direction parallel to the plane of the drawing sheet and incident on the polarizing beam splitter 203. The P-polarized light transmitted by the polarizing spitting portion 203P of the polarizing beam splitter 203 is then incident on the color-composing/separating prism 300.

The source light is incident on the first surface 204a of the prism 204, and partially reflected by the second surface 204b. The light component that has been reflected by the second surface 204b of the prism 204 is then reflected by the first surface 204a and emitted from the third surface 204c as a B light. The B light emergent from the third surface 204c then passes through the wave plate 208B and enters the light valve 209B for B light.

The light component that has transmitted through the second surface 204b of the prism 204 is then incident on the first surface 205a of the prism 205 and partially reflected by the second surface 205b. The light component that has been reflected by the second surface 205b of the prism 205 is then reflected by the first surface 205a and emitted from the third surface 205c as an R light. The R light emergent from the third surface 205c then passes through the wave plate 208R and enters the light valve 209R for R light.

The light component that has been transmitted by the second surface 205b of the prism 205 is then incident on the first surface 206a of the prism 206. That light is totally reflected by the second surface 206b and emitted from the third surface 206c as a G light. The G light emergent from the third surface 206c then passes through the wave plate 208G and enters the light valve 209G for G light.

After passing through the wave plates 208R, 208G and 208B, the modulated lights having been modulated by the light valves 209R, 209G and 209B are incident on the color-composing/separating prism 300 again as S-polarized lights, while the non-modulated lights that have not been modulated are incident on the color-composing/separating prism 300 again as P-polarized lights.

The color-composing/separating prism 300 color-composes the reflected lights from the light valves 209R, 209G and 209B. The color-composed light (or composite light) emergent from the first surface 204a of the prism 204 is then analyzed by the polarizing splitting portion 203P of the polarizing beam splitter 203, and only the S-polarized light components that have been modulated by the light valves 209R, 209G and 209B are incident on the projection lens 210.

The projection lens 210 projects images of the light valves 209R, 209G and 209B for the respective colors of R (red), G (green) and B (blue) to form a full color image on a screen (not shown).

If there is a change in the phase of polarization caused by the liquid crystal layers of the reflective light valves, if the dichroic films and the total reflection films have such properties that differentiate the state of polarization between the light incident on them and the light emergent from them, or if a change in the phase of polarization occurs due to the combination of the above two causes, the wave plates 208R, 208G and 208B should be replaced by such wave plates that have properties of quarter-wave plates added with phases for compensating the change in the polarization state.

In the case in which the optical properties of the dichroic films and the total reflection films are so designed and manufactured that the polarization state of a color light incident on and emergent from them does not change and a change in the phase of polarization caused by the liquid crystal layers of the reflective light valves is negligible, quarter-wave plates will be used as the wave plates.

The prisms 204, 205 and 206, the wave plates 208B, 208R and 208G and light valves 209B, 209R and 209G are respectively made integral (namely, the prism 204, the wave plate 208B and the light valve 209B are made integral and so on). In addition, the spaces formed between the prisms 204, 205 and 206 and the light valves 209B, 209R and 209 with the wave plates 208R, 208G and 208B inserted therebetween are adapted to be protected from dust (by a dustproof structure) and adapted to be cooled.

As a structure for enabling proofing against dust and cooling, the structure shown in FIGS. 1 to 3 is adopted.

All of the above-mentioned constituent parts except for the projection lens are disposed in the interior of a housing similar to the housing shown in FIG. 1 (designated by numeral 120). In addition, those parts within the housing receive cooling airflow from a cooling fan 140 (see FIG. 1) blown in the direction perpendicular to the plane of the drawing sheet of FIG. 5.

This embodiment attains the advantageous effects same as those of the first embodiment.

In the above-described embodiments, cooling is performed by supplying cooling airflow to a portion of the holder made of a metal, but the cooling structure is not limited to this. For example, cooling may also be effected by means of a cooling element.

Figure 6:
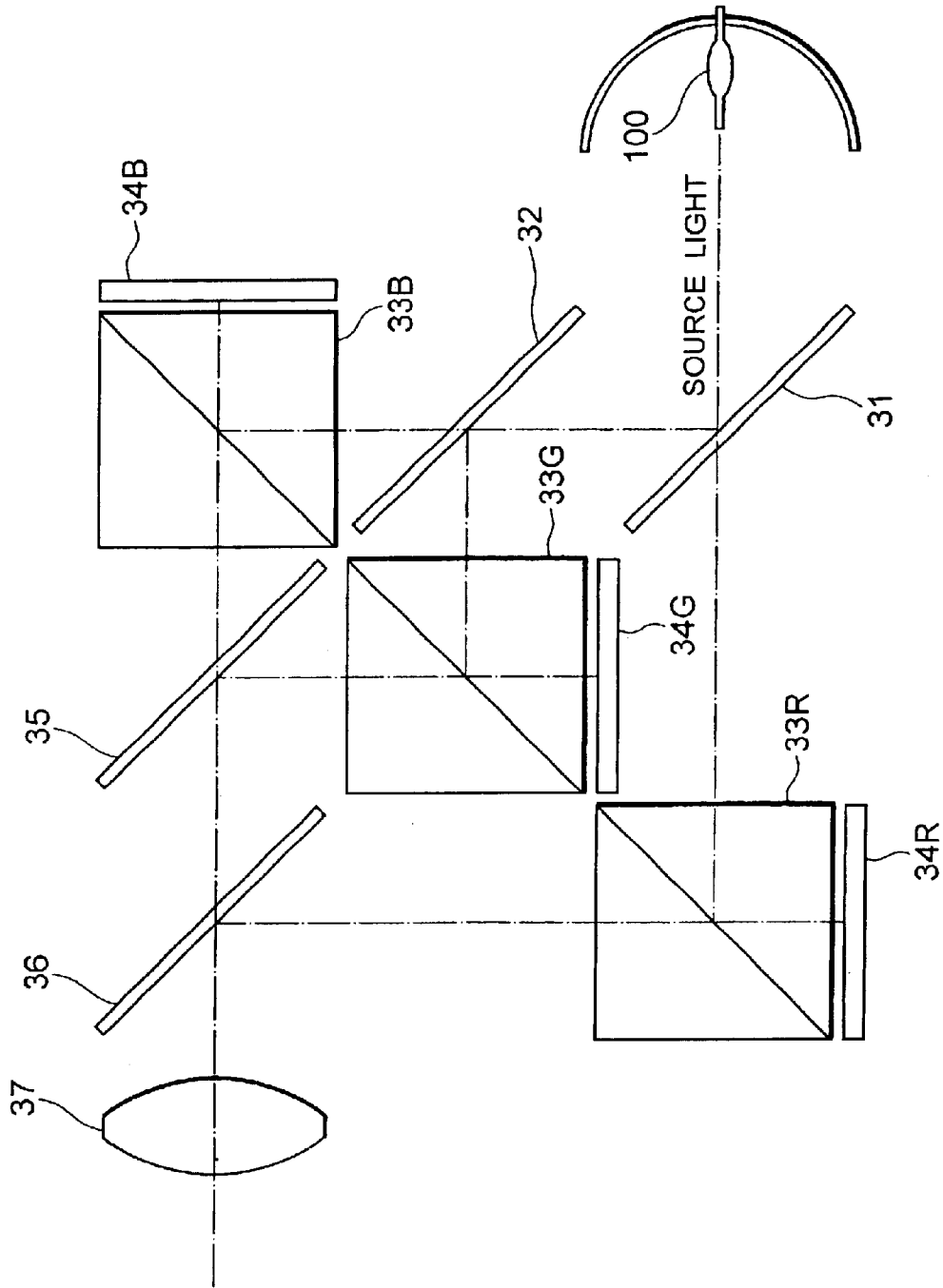
FIG. 6 is a diagram showing an example of a projection display apparatus using reflective light valves to which the present invention is applied.

Next, in the following, the structure of another type of projection display apparatus using reflective light valves will be described with reference to FIG. 6.

In this projection display apparatus, source light emitted from the light source 100 is color-separated, by dichroic mirrors 31 and 32 that are arranged parallel to each other, into three primary color lights, that is an R (red) light, a G (green) light and a B (blue) light, which are made incident on polarizing beam splitters 33R, 33G and 33B respectively.

The lights of the respective colors incident on the polarizing beam splitters 33R, 33G and 33B respectively are reflected by the polarizing splitting portions of the corresponding polarizing beam splitters and emitted from the respective emergence surfaces (or exit surfaces) to enter reflective light valves 34R, 34G and 34B respectively.

The lights modulated and reflected by the reflective light valves 34R, 34G and 34B are incident on the polarizing beam splitters 33R, 33G and 33B again, and only the modulated lights are analyzed to be picked up as lights to be projected. The picked up lights are then incident on the dichroic mirrors that constitutes a color-composing/separating optical system so as to be color-composed. The composite light is made incident on a projection lens 37 so that a full color projected image is formed on a screen (not shown) at an enlarged size.

In the projection display apparatus shown in FIG. 6, it is also possible to realize integration of the light valves and the corresponding polarizing beam splitters and to attain dustproof function and cooling functions by adopting a structure shown in FIGS. 1 to 3 or a structure that will be described in the following with reference to FIGS. 7–12.

Figure 11:
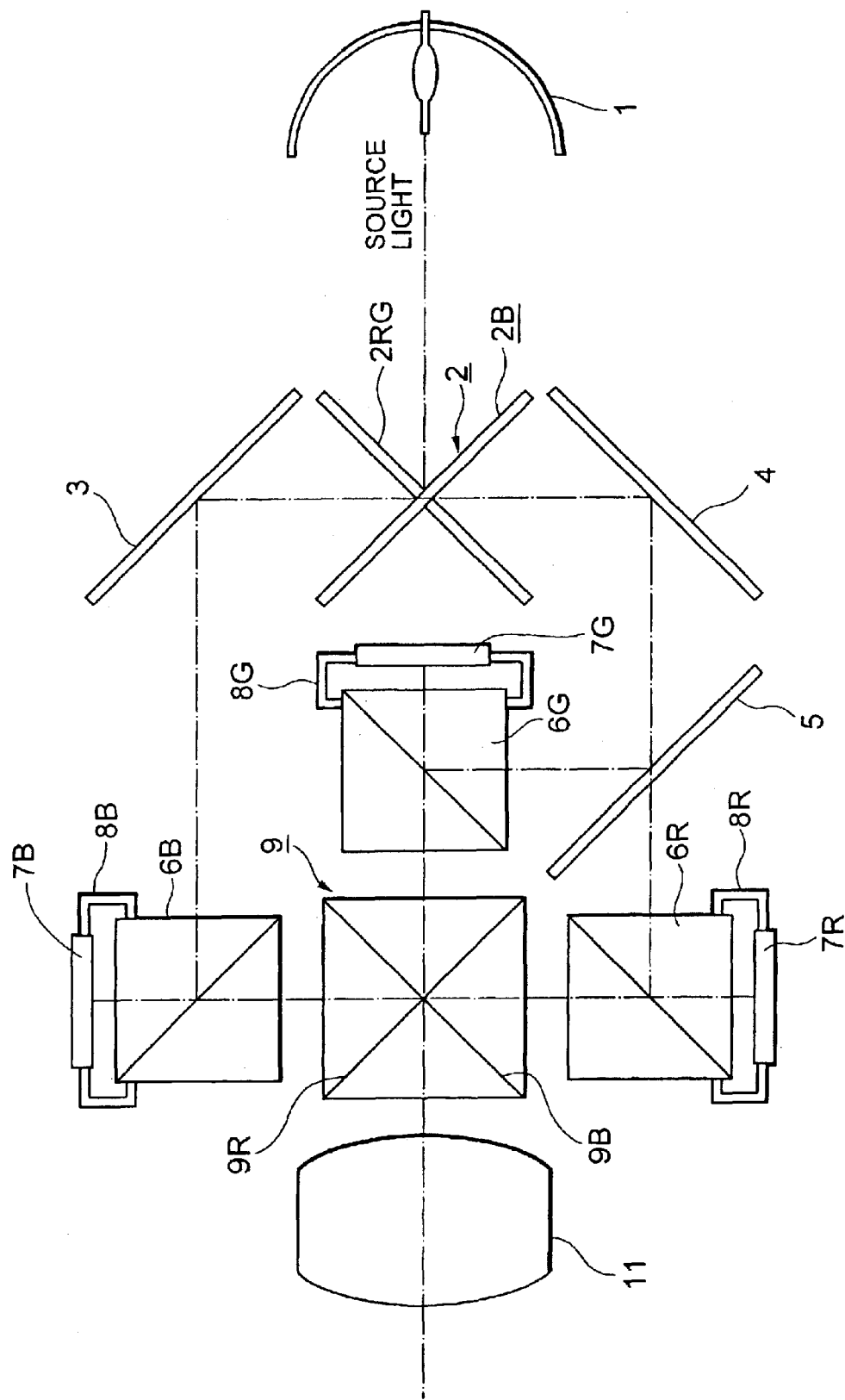
FIG. 11 is a diagram showing the basic structure of the projection display apparatus according to the third embodiment of the present invention.

FIG. 11 is a diagram showing the basic structure of a projection display apparatus according to a third embodiment of the present invention.

Source light emitted from a light source 1 composed of a lamp and a concave mirror such as parabolic mirror is incident on a cross dichroic mirror 2 in which a dichroic mirror 2B having a property of reflecting B light and a dichroic mirror 2RG having a property of reflecting R light and G light are arranged orthogonal to each other to form an X-shape. The light incident on the dichroic mirror 2 is color-separated into a B light and a mixed light including R light and G light, which travel toward directions opposite to each other.

The B light thus color-separated is reflected by a deflecting mirror 3 to change its direction of travel and incident on a polarizing beam splitter 6B provided for the B light. On the other hand, the mixed light including R light and G light is reflected by a deflecting mirror 4 to change its direction of travel and incident on a dichroic mirror 5 that has a property of reflecting G light, so as to be color-separated into an R light that is transmitted for further traveling and a G light that is reflected for further traveling. The R light and the G light thus separated are incident on a polarizing beam splitter 6R and a polarizing beam splitter 6G respectively.

Each of the polarizing beam splitters 6B, 6G and 6R has a compound prism structure that is composed of two triangle prisms with a polarizing splitting film being inserted therebetween.

The lights of the respective colors incident on the polarizing beam splitters 6R, 6G and 6B provided for the respective color lights are reflected by the corresponding polarizing splitting surfaces and emitted from the emergence surfaces of the polarizing beam splitters 6R, 6G and 6B. The lights emergent from the emergence surfaces are then incident on reflective light valves disposed in the vicinity of the emergence surfaces.

The lights are modulated and reflected by the light valves 7R, 7G and 7B, and then incident on the polarizing beam splitters 6R, 6G and 6B again so as to be separated by the polarizing splitting portions into modulated lights that are transmitted by the polarizing splitting portions and non-modulated lights that are reflected by the polarizing splitting portions.

The modulated lights that have been transmitted by the polarizing splitting portions are picked up (or analyzed) and made incident on a cross dichroic prism 9 for color-composing the analyzed lights of the respective colors from different incidence surfaces.

The analyzed B light incident on the cross dichroic prism 9 is reflected by a B light reflected dichroic film 9B, while the analyzed R light is reflected by an R light reflected dichroic film 9R. On the other hand, the analyzed G light is transmitted by both the films 9R and 9B. Thus, the lights of the three primary colors are color-composed, and the composite light is emitted from an emergence surface.

The composite light is then incident on the projection lens 11, so that a full color image is projected onto a screen (not shown) at an enlarged size.

The space between the polarizing beam splitter 6R and the light valve 7R are made into a dustproof space by a dust proofing integration member 8R (schematically illustrated in a simplified manner in FIG. 11), which will be described later. Furthermore, the space between the polarizing beam splitter 6G and the light valve 7G are made into a dustproof space by a dust proofing integration member 8G (schematically illustrated in a simplified manner in FIG. 11), which will be described later. Still further, The space between the polarizing beam splitter 6B and the light valve 7B are made into a dustproof space by a dust proofing integration member 8B (schematically illustrated in a simplified manner in FIG. 11), which will be described later.

Here, a description will be made, with reference to FIGS. 7 and 8, of dust proofing integrated structures of the polarizing beam splitters 6R, 6G and 6B and the light valves 7R, 7G and 7B that use the above-mentioned dust proofing integration members 8R, 8G and 8B. While the following description will be made with respect to the dust proofing integration member 8G for G light, the dust proofing integration members 8R and 8B for R light and B light have the structure same as that for the dust-proofing integration member 8G. Therefore, in the following description and in FIGS. 7 and 8, the suffixes "R", "B" and "G" in the reference signs will be omitted.

Figure 7:
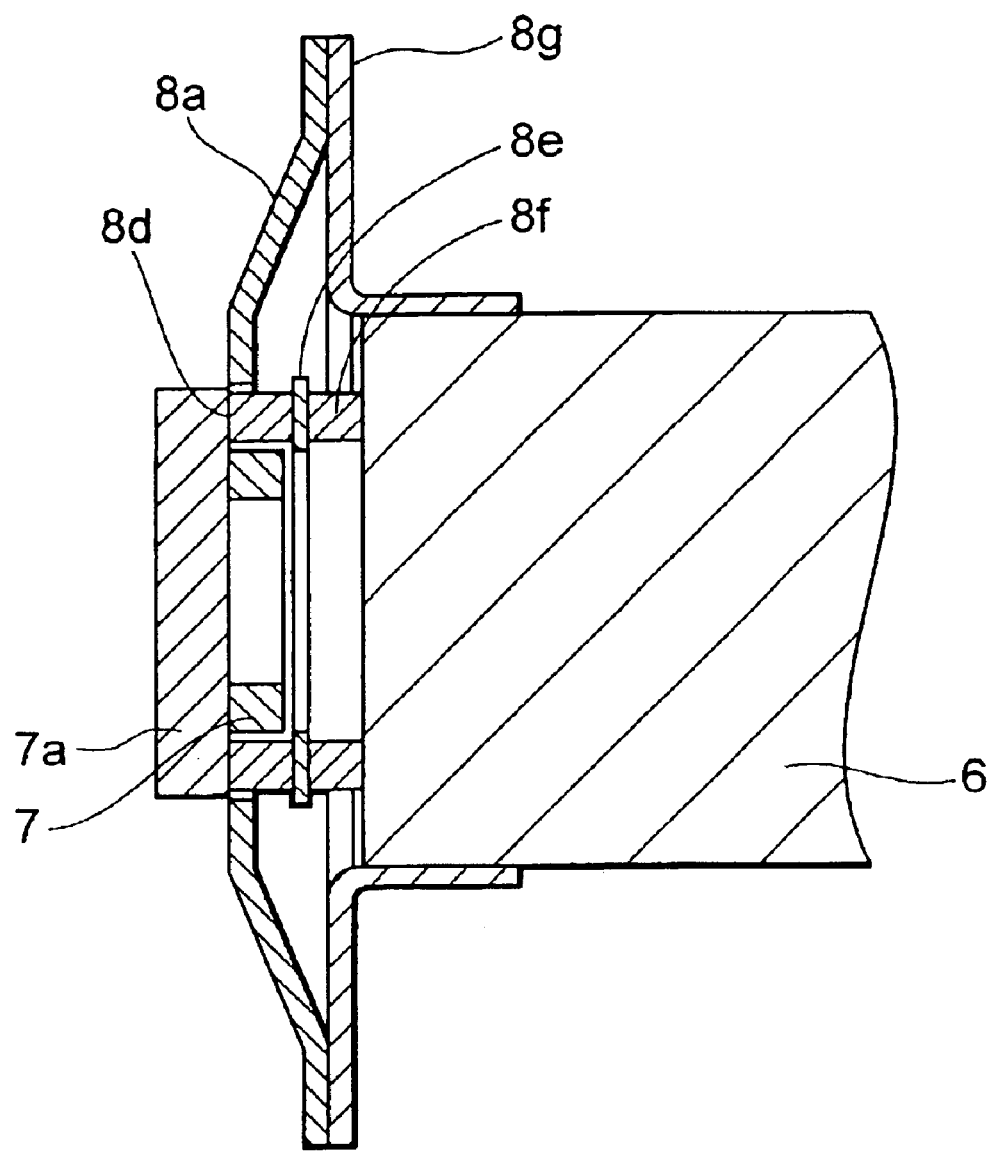
FIG. 7 is a schematic cross sectional view showing a dustproof structure of a projection display apparatus according to a third embodiment of the present invention.
Figure 8:
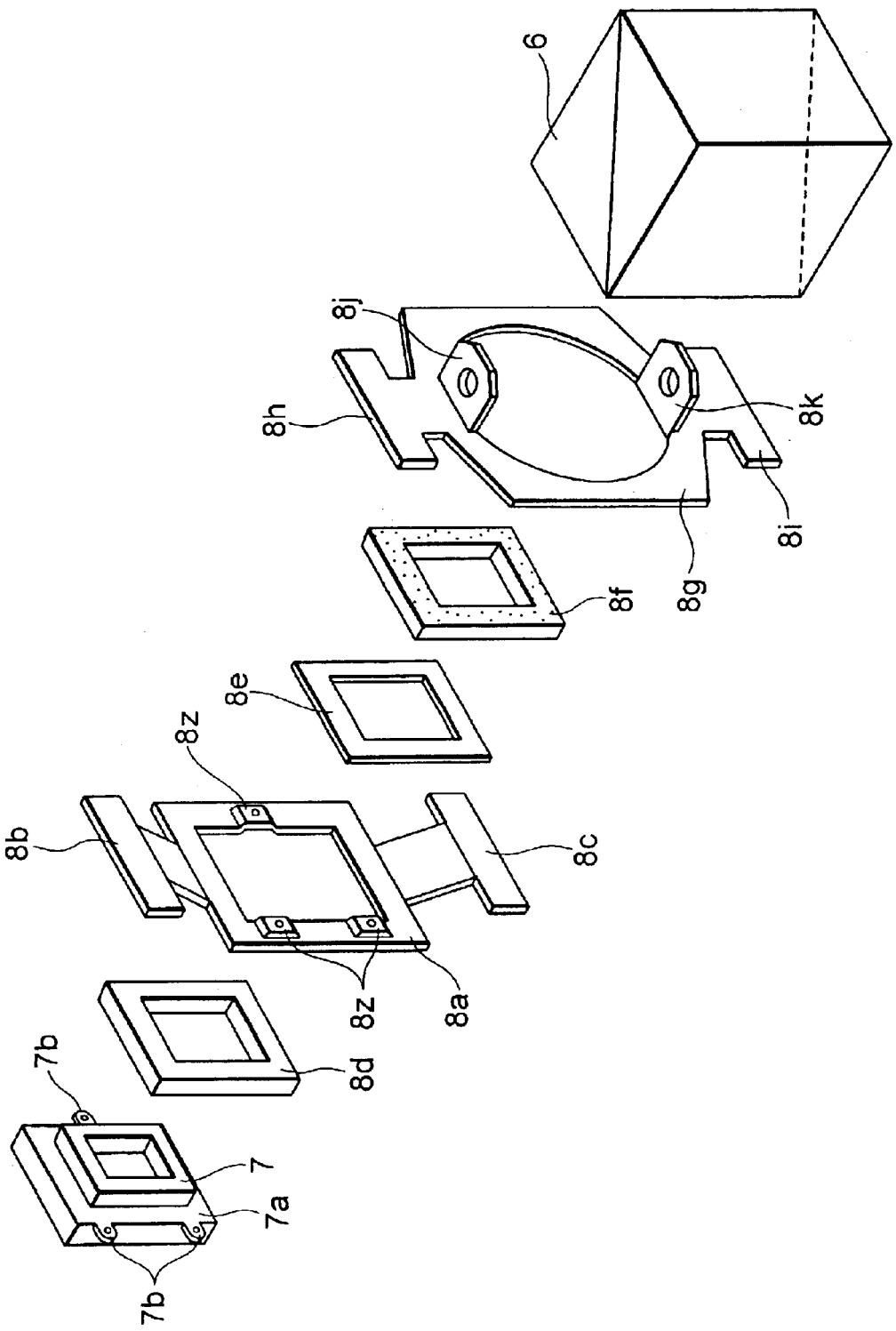
FIG. 8 is an exploded perspective view showing the members constituting the dustproof structure shown in FIG. 7.

FIG. 7 is a cross sectional view showing a dust proofing integral member 8. FIG. 8 is an exploded perspective view of the same.

The light valve 7 will be described first. The light valve 7 is bonded to a backside cooling plate 7a provided on the backside of the light valve 7 by an adhesive that has a good thermal conductivity, so that the light valve 7 is made integral with the backside cooling plate 7a. The size of the backside cooling plate 7a is larger than the size of the light valve 7. The bonding is made in such a manner that a margin of a substantially constant width would remain around the light valve 7. In addition, as shown in FIG. 8, the backside cooling plate 7a is provided with extensions having mount holes 7b to which screws for securing the backside cooling plate 7a to a light valve holder 8a (which will be described later) are to be inserted. The extensions are provided on the both lateral sides of the surface of the backside cooling plate to which the light valve 7 is bonded.

The light valve holder 8a is composed of a metal member having an opening of the size substantially the same as the outer size of the backside cooling plate 7a at its center. On the outer frame of the light valve holder 8a, there is provided female screws 8z at positions corresponding to the mount holes 7b of the backside cooling plate 7a.

The light valve holder 8a and the backside cooling plate 7a are secured together with screws, under the state in which the mount holes 7b and the female screws 8z are aligned. The light valve holder 8a has joining portions 8b and 8c formed at its upper and lower portions and extending obliquely from the plane in which the opening is formed. The light valve holder 8a is soldered to the polarizing beam splitter holder 8g attached with the polarizing beam splitter 6 (which will be described later) at these joining portions, so that the light valve holder 8a is made integral with the polarizing beam splitter holder 8g.

The polarizing beam splitter 6 is attached to the polarizing beam splitter holder 8g at the top and bottom surfaces thereof that are orthogonal to the incidence (or entrance) surface for the light from the light valve 7. The polarizing beam splitter holder 8g is composed of a metal member having an opening at its center. Portions of the upper and lower edges of the opening are bent at a right angle with respect to the plane of the opening to form attaching portions 8j and 8k for receiving the top and bottom surfaces of the polarizing beam splitters 6 therebetween for attachment. The polarizing beam splitter holder 8g has joining portions 8h and 8i formed at its upper and lower ends, to which the above-mentioned soldering portions 8b and 8c of the light valve holder 8a are to be attached by soldering.

The polarizing beam splitter 6 is pinched by the polarizing beam splitter attaching portions 8j and 8k at its top and bottom surfaces so as to be bonded by adhesive.

Then, the light valve holder 8a having been made integral with the backside cooling plate 7a attached with the light valve 7 and the polarizing beam splitter holder 8g attached with the polarizing beam splitter 6 are integrally secured together by soldering made at the joining portions 8b and 8h and the joining portions 8c and 8i respectively. In connection with this, the space between the light valve 7 and the polarizing beam splitter 6 is adapted to be a dustproof space by means of a first dust proofing sheet 8d, an auxiliary member 8e and a second dust proofing sheet 8f. The combination of the first dust proofing sheet 8d, the auxiliary member 8e and the second dustproof member 8f is an example of the dust-proofing integration members 8R, 8G and 8B that were described before in connection with FIG. 11.

In the following, the above-described structure and how this structure is assembled will be specifically described with reference to FIGS. 7 and 8. The first dust proofing sheet 8d is made of a material that is deformable upon application of stress and having a frame-like shape having an opening larger than the outer size of the light valve 7. The thickness of the first dust proofing sheet 8d is larger than that of the light valve 7. Thus, the light valve 7 is inserted through the opening of the first dust proof sheet 8d, and then the upper and lower and right and left parallel frame portions of the dust proof sheet 8d defining the opening, are brought into contact with a surface of the cooling plate 7a which surface surrounds and is adjacent to the surface of the cooling plate 7a on which the backside of the light valve 7 is attached.

The second dust proofing sheet 8f is made of the same material and having the substantially the same shape as the first dust proofing sheet 8d. A adhesive sheet (indicated by a dot hatch pattern in FIG. 8) is attached on one of the parallel frame surfaces on which the opening is formed. The adhesive sheet is attached to the analyzed light emergence surface of the polarizing beam splitter 6 that is secured to the polarizing beam splitter holder 8g (where the analyzed light emergence surface refers to the surface of the polarizing beam splitter 6 from which the analyzed light emerges or exits).

Then, the light valve holder 8a and the polarizing beam splitter holder 8g are united by soldering under the state in which the frame of the first dust proofing sheet 8d and the frame of the second dust proofing sheet 8f are in contact with each other. At that time, the auxiliary member 8e is inserted between the contact portions of both the dust proofing sheets 8d and 8f so as to be in contact with them in order to make the dustproof effect reliable. The auxiliary member 8e is preferably made of a material that does not change its thickness and shape upon application of stress. For example, the auxiliary member 8e may be a frame-like thin plate made of vinyl chloride.

The auxiliary member 8e is provided in order to ensure dustproof effect realized by contact of the first dust proofing sheet 8d and the second dust proofing sheet 8f, and it is not necessarily required to be provided. Therefore, it is not required if the surface conditions of the contact portions of the first dust proofing sheet 8d and the second dust proofing sheet 8f are good. In the case in which their surface conditions are not good, the dust proofing sheets are brought into press contact with the auxiliary member 8e that has a smooth surface.

As will be understood from the cross sectional diagram in FIG. 7, the space between the analyzed light emergence surface of the polarizing beam splitter 6 and the light valve 7 can be made into a dustproof space by means of the first dust proofing sheet 8d, the second dust proofing sheet 8f and the auxiliary member 8e. In addition, since in this embodiment the dustproof structure is realized by two sheets bought into contact with each other, the thickness of each sheet may be as small as about half the length of the dustproof space. Therefore, manufacturing of the dust proofing sheets is easy, assembling is also easy, and it is possible to reduce its cost.

As per the above, in the projection display apparatus according to this embodiment, it is easily possible to construct the space between the polarizing beam splitter and the light valve as a dustproof structure, so that dust images in projected images can be eliminated.

In the above structure, the dust proofing sheet(s) is not necessarily required to be bonded.

Next, a projection display apparatus according to a fourth embodiment of the present invention will be described. The projection display apparatus according to the fourth embodiment has basically the same structure as the projection display apparatus shown in FIG. 11, but in the projection display apparatus according to the fourth embodiment, quarter-wave plates (not shown) are provided between the reflective light valves 7R, 7G and 7B and the polarizing beam splitters 6R, 6G and 6B.

Figure 9:
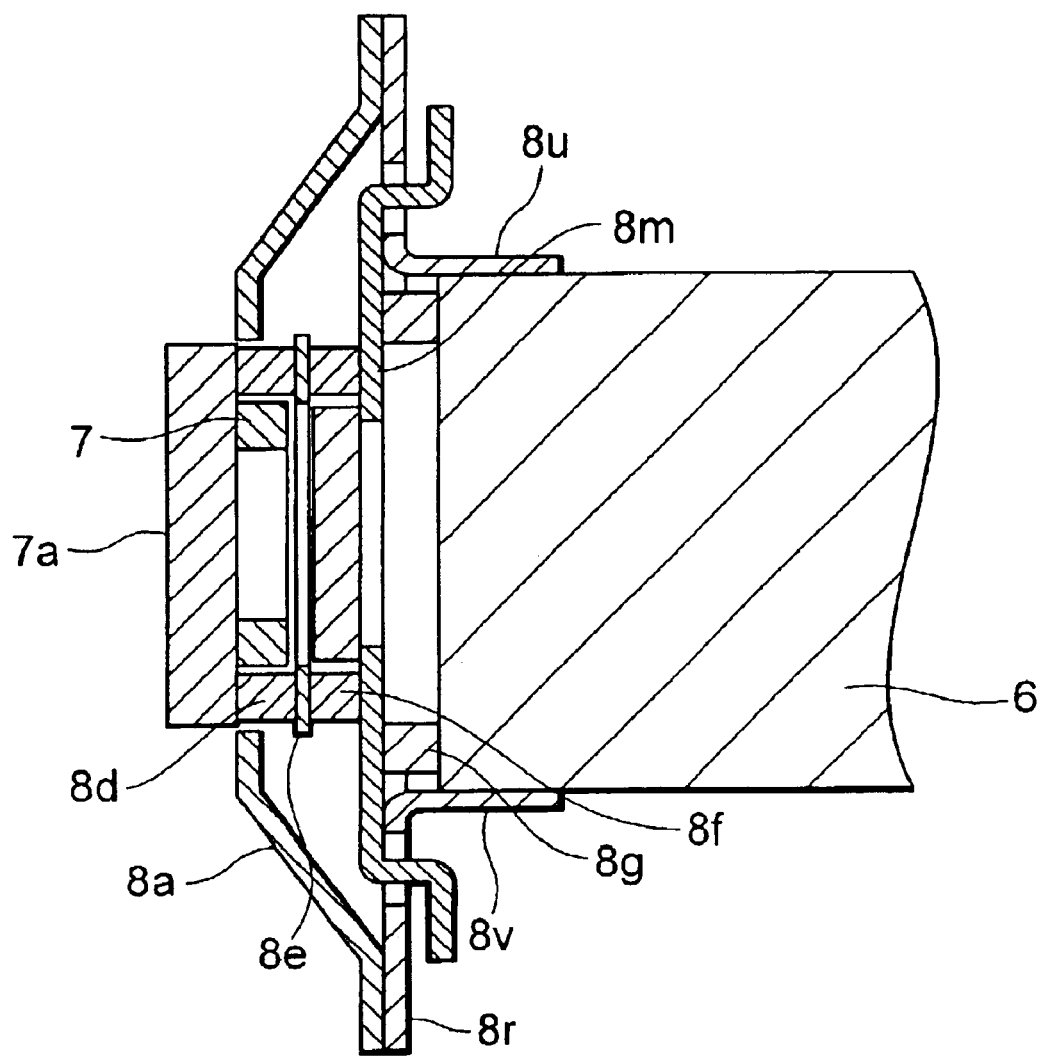
FIG. 9 is a schematic cross sectional view showing another example of the dustproof structure of the projection display apparatus according to the third embodiment of the present invention.
Figure 10:
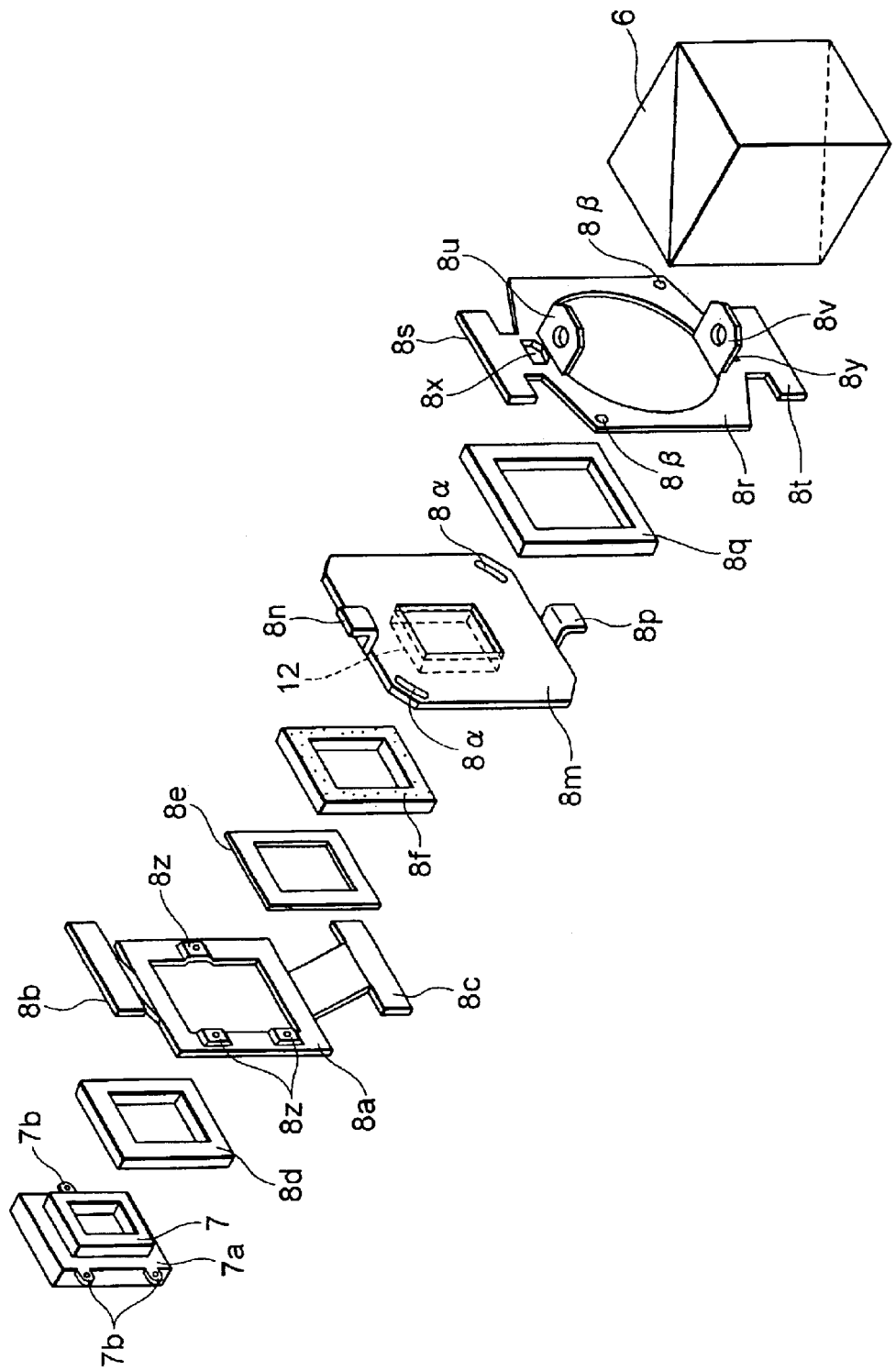
FIG. 10 is an exploded perspective view showing the members constituting the dustproof structure shown in FIG. 9.

The structure of dustproof integrating members 8R, 8G and 8B will be described taking the member 8G as a representative, with reference to a cross sectional diagram presented as FIG. 9 and an exploded perspective view presented as FIG. 10. The other dustproof integrating members 8R and 8B have the same structure as the dustproof integrating member 8G, as is the case in the third embodiment. Therefore, in the following descriptions and related drawings, the suffixes "R", "B" and "G" in the reference signs will be omitted. In FIGS. 9 and 10, the elements same as those in FIGS. 7 and 8 are designated with the same reference numerals and descriptions of some of those elements will be omitted.

In FIGS. 9 and 10, reference sign 8r designates a polarizing beam splitter holder. The polarizing beam splitter holder 8r has a structure substantially the same as the polarizing beam splitter holder 8g in the third embodiment. However, the polarizing beam splitter holder 8r differs from the holder 8g in that it is additionally provided with holes 8x and 8y through which portions of a quarter-wave plate holder 8m attached with a quarter-wave plate 12 (which will be described later) is inserted to be secured for integration and female screws 8β that are to be used for determining fixed position of the quarter-wave plate holder with respect to rotation about the optical axis.

The manner how the backside cooling plate 7a attached with the light valve 7 is mounted on the light valve holder 8 and the manner how the polarizing beam splitter 6 is mounted on the polarizing beam splitter holder 8r are the same as those in the third embodiment.

In the fourth embodiment, the quarter-wave plate holder 8m for securing the quarter-wave plate 12 is used. The quarter-wave plate holder 8m is made of a metal plate and having an opening at its center. The quarter-wave plate holder 8m has arcuate holes 8α formed in the periphery of the opening for allowing adjustment of the rotational position of the quarter-wave plate holder 8m about the optical axis and extensions 8n and 8p extending from the upper and lower portions of the holder. The extensions 8n and 8p are to be inserted into the holes 8x and 8y provided on the polarizing beam splitter holder 8r for determining the rotation angle of the quarter-wave plate with respect to the optical axis and fixing it.

The quarter-wave plate 12 is attached to the quarter-wave plate holder 8m on the light valve side surface thereof (see FIG. 10) in such a way that the quarter-wave plate 12 fully covers the opening of the quarter-wave plate holder 8m. The extensions 8n and 8p of the quarter-wave plate holder 8n attached with the quarter-wave plate 12 are inserted into the holes 8x and 8y of the polarizing beam splitter holder 8r attached with the polarizing beam splitter 6. In doing so, a third dust proofing sheet 8q of a frame-like shape having elastic deformability is inserted between the quarter-wave plate holder 8m and the polarizing beam splitter holder 8r, so that the dust proofing sheet 8q is brought into contact with the outer periphery of the opening of the quarter wave phase holder 8m and the emergence surface of the polarizing beam splitter.

In addition, screws are inserted through the arcuate holes 8α of the quarter-wave plate holder 8m and threaded into the female screws 8β of the polarizing beam splitter holder 8r. On the other hand, as described in connection with the third embodiment, the light valve 7 is bonded to the backside cooling plate 7a with an adhesive having good thermal conductivity, and the backside cooling plate 7a and the light valve holder 8a are fastened by screws.

Then the first dust proofing sheet 8d, the second dust proofing sheet 8f and the auxiliary member 8e are placed between the thus integrated combination of the light valve 7, the backside cooling plate 7a and the light valve holder 8a and the quarter-wave plate holder 8*m*. In doing so, the frame portion of the first dust proofing sheet 8*d* is brought into contact with the backside cooling plate 7*a* with the light valve 7 being received in the opening of the first dust proofing sheet 8*d*, while the frame portion of the second dust proofing sheet 8*f* is brought into contact with the quarter-wave plate holder 8*m* with the quarter-wave plate 12 being received in the opening of the second dust proofing sheet 8*f*.

In this state, the joining portions 8*b* and 8*c* of the light valve holder 8*a* and the soldering portions 8*s* and 8*t* of the polarizing beam splitter holder 8*y* are secured together by soldering. Then, the first dust proofing sheet 8*d* and the second dust proofing sheet 8*f* are pressed by the backside cooling plate 7*a* and the quarter-wave plate holder 8*m* to deform, so that the first dust proofing sheet 8*d* is brought into tight contact with the backside cooling plate 7*a* and the auxiliary member 8*e*, while the second dust proofing sheet 8*f* is brought into tight contact with the auxiliary member 8*e* and the quarter-wave plate holder 8*m*. On the other hand, the third dust proofing sheet 8*q* is pinched and pressed between the quarter-wave plate holder 8*m* and the polarizing beam splitter 6 so as to be brought into tight contact with them. Thus, the space formed by the apertures of the first dust proofing sheet 8*d*, the second dust proofing sheet 8*f*, the auxiliary member 8*e* and the third dust proofing sheet 8*q* becomes a dustproof space, in which the light valve 7 is accommodated. Therefore, dust is prevented from adhering to the light valve 7.

Under this state, the quarter-wave plate holder 8*m* is rotated with respect to the optical axis using the screws that is threaded in the female screws 8β of the polarizing beam splitter holder 8*r* and passed through the arcuate holes 8α of the quarter-wave plate holder 8*m* as support shafts, so that the position of the quarter-wave plate is determined. Then the extensions 8*n* and 8*p* that are passed through the holes 8*x* and 8*y* are secured to the holes 8*x* and 8*y* by an adhesive.

As per the above, in the projection display apparatus having a quarter-wave plate 12 between the light valve 7 and the polarizing beam splitter 6 also, it is possible to realize a dustproof structure between the light valve 7 and the polarizing beam splitter 6 to prevent dust from adhering to the light valve in like manner as the third embodiment. Thus, it is possible to project a high contrast image free from images of dust.

In the following, a projection display apparatus shown in FIG. 12 according to a fifth embodiment of the present invention will be described.

In this projection display apparatus, source light is made incident on a polarizing beam splitter 23, one of the polarized light components that have been polarizing-split is color-separated, by a color-separating/composing compound prism 24 composed of prisms 24B, 24R and 24G and multiple dichroic films formed therein, into a B light, a G light and an R light. These lights are emitted from the compound prism 24 and incident on reflective light valves 25B, 25G and 25R respectively. Thus, they are subjected to modulation and reflected by the light valves 25B, 25G and 25R. The lights emergent from the light valves 25B, 25G and 25R are then incident on the compound prism 24 so as to be color-composed, so that a composite light is emitted from the compound prism 24. The composed light emergent from the compound prism is incident on the polarizing beam splitter 23, and the analyzed light is picked up and projected by a projection lens 26.

In this type of projection display apparatus also, it is possible to realize the dustproof structure the same as that of the third embodiment between the each of the prisms in the compound prism and each of the light valves for the respective colors to attain the same advantageous effects. This will be attained by replacing the polarizing beam splitter 6 in the third embodiment with the prism 24G.

Figure 12:
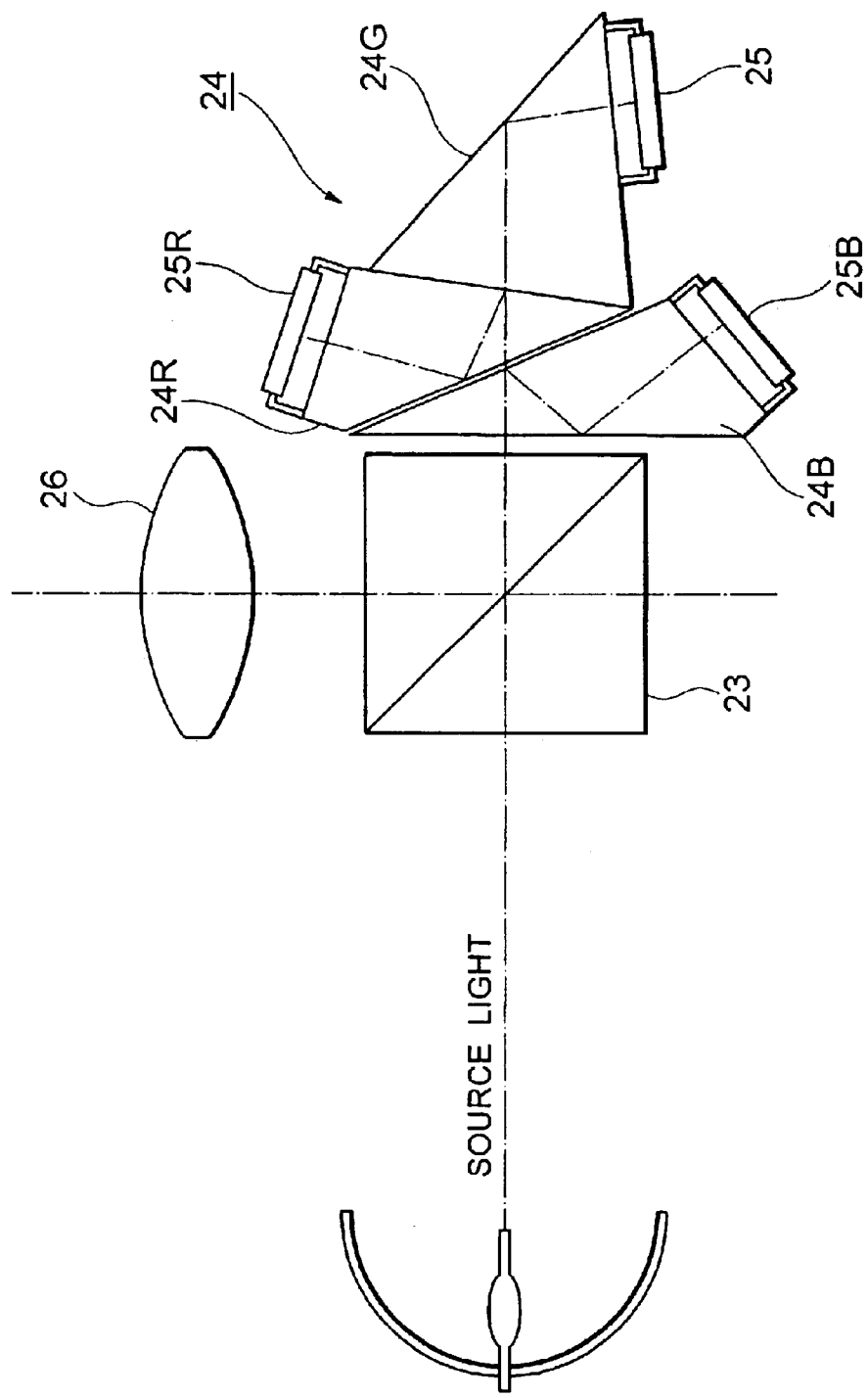
FIG. 12 is a diagram showing the basic structure of a projection display apparatus according to a fourth embodiment of the present invention.

In addition, in the projection display apparatus shown in FIG. 12, quarter-wave plates or other wave plate (depending on the states of the traveling color lights) may be provided between the light valves 25B, 25G and 25R for the respective color lights and the prisms 24B, 24G and 24R. In this case, a projection display apparatus that offers the same advantageous effects can be realized by adopting the same dustproof structure while replacing the polarizing beam splitters of the fourth embodiment with the prisms of the compound prism, and if wave plates other than quarter-wave plate are used, replacing the quarter-wave plates with such wave plates.

As has been described in the foregoing, the present invention can provide a projection display apparatus in which dust would be prevented from adhering to surfaces of reflective light valves.

What is claimed is:

1. A projection display apparatus in which a light emitted from a reflective light valve is made incident on a prism member and a light having passed through said prism member is projected by a projection lens, the apparatus comprising a dust proofing cover that provides a seal between an emergence surface of said reflective light valve and an incidence surface of said prism member.

2. A projection display apparatus according to claim 1, wherein said dust proofing cover has such a structure in which a plurality of dust proofing members that have openings through which a light emergent from said reflective light valve is to be passed are joined.

3. A projection display apparatus according to claim 2, further comprising a wave plate disposed between said reflective light valve and said prism member, wherein said wave plate is held by one of said dust proofing members.

4. A projection display apparatus according to claim 3, wherein said wave plate is a quarter-wave plate.

5. A projection display apparatus according to claim 3, wherein said prism member comprises a polarizing beam splitter that analyzes a light having passed through said wave plate.

6. A projection display apparatus according to claim 5, wherein said wave plate is a quarter-wave plate.

7. A projection display apparatus in which a light emitted from a reflective light valve is made incident on a prism member and a light having passed through said prism member is projected by a projection lens, comprising:

a plate having an outer size larger than said reflective light valve on which said reflective light valve is attached; and at least two dust proofing members provided between said plate and the incidence surface of said prism member, said dust proofing members being deformable upon application of stress and each having an opening having a size sufficient for surrounding said reflective light valve;

wherein, said reflective light valve is inserted in the opening of a first dust proofing member among said dust proofing members and a frame portion of said first dust proofing member is pressed against said plate;

a frame of a second dust proofing member among said dust proofing members is pressed against the incidence surface of said prism member;

said first dust proofing member and said second dust proofing member are in contact with each other, or alternatively, at least one of another member having a frame-like structure and another dust proofing member is provided between said first dust proofing member and said second dust proofing member; and a compressing force is applied to said plate and said prism member in a sandwiching manner.

8. A projection display apparatus according to claim 7, wherein said another member having a frame-like structure comprises an auxiliary member of a thin plate-like shape.

9. A projection display apparatus according to claim 7, wherein said another member having a frame-like structure comprises a wave plate holding member having a frame-like shape attached with a wave plate, another dust proofing member having a frame-like shape is attached to a frame portion of the wave plate holding member at its side facing said reflective light valve, and the frame portion of this dust proofing member is in direct contact with said first dust proofing member or at least one of still another member of a frame-like structure and still another dust proofing member is provided between them.

10. A projection display apparatus according to claim 9, wherein said wave plate is a quarter-wave plate.

11. A projection display apparatus in which a light emitted from a reflective light valve is made incident on a prism member via a wave plate and a light having passed through said prism member is projected by a projection lens, comprising:

a dust proofing cover that seals a space between said reflective light valve and said prism member to realize a dustproof structure, said space containing said wave plate; and a holding member made of a metal to which said wave plate is directly attached, for disposing said wave plate in said space protected from dust by said dust proofing cover;

wherein a part of said holding member is exposed to the exterior of said space of a dustproof structure.

12. A projection display apparatus according to claim 11, wherein said dust proofing cover has such a structure in which a plurality of dust proofing members that have openings through which a light emergent from said reflective light valve is to be passed are joined.

13. A projection display apparatus according to claim 11, wherein said prism member comprises a polarizing beam splitter that analyzes a light having passed through said wave plate.

14. A projection display apparatus according to claim 13, wherein cooling airflow is delivered to said part of said holding member made of a metal that is exposed to the exterior of the space of a dustproof structure, or said part of said holding member made of a metal that is exposed to the exterior of the space of a dustproof structure is cooled by a cooling element, so that said wave plate is cooled.

15. A projection display apparatus according to claim 14, wherein said wave plate is a quarter-wave plate.

16. A projection display apparatus according to claim 11, wherein cooling airflow is delivered to said part of said holding member made of a metal that is exposed to the exterior of the space of a dustproof structure, or said part of said holding member made of a metal that is exposed to the exterior of the space of a dustproof structure is cooled by a cooling element, so that said wave plate is cooled.

17. A projection display apparatus according to claim 16, wherein said wave plate is a quarter-wave plate.

18. A projection display apparatus according to claim 11, wherein said wave plate is a quarter-wave plate.

19. A holding member for use in a projection display apparatus in which a light emitted from a reflective light valve is made incident on a prism member via a wave plate and a light having passed through said prism member is projected by a projection lens, the holding member being adapted to hold said reflective light valve, said wave plate and said prism member integrally, wherein a space between said reflective light valve and said prism member that contains said wave plate is sealed to become a dustproof structure, and a part of the holding member made of a metal for disposing said wave plate in said space of a dustproof structure is exposed to the exterior of said space of a dustproof structure, said wave plate being directly attached to said holding member.

20. A holding member according to claim 19, wherein said wave plate is a quarter-wave plate.

* * * * *